United States Patent [19]

Becicka et al.

[11] Patent Number: 4,954,042
[45] Date of Patent: Sep. 4, 1990

[54] DOUBLE TELESCOPING ARM FOR ROBOTIC PALLETIZERS AND THE LIKE

[75] Inventors: Kenneth F. Becicka, Alvin; Neal C. Chamberlain, Hoopeston, both of Ill.

[73] Assignee: FMC Corporation, Chicago, Ill.

[21] Appl. No.: 242,669

[22] Filed: Sep. 12, 1988

[51] Int. Cl.$^5$ .............................................. B66C 23/00
[52] U.S. Cl. .................................... 414/718; 414/750; 414/751; 901/14; 212/230; 212/267; 52/118
[58] Field of Search ................ 901/13, 14, 16, 21, 901/23, 35; 414/718, 728, 749, 750, 751, 752, 753; 212/184, 187, 230, 264, 267, 268, 269; 52/118, 632, 645

[56] References Cited

U.S. PATENT DOCUMENTS

| | | | |
|---|---|---|---|
| 3,836,011 | 9/1974 | Sakamoto et al. | 212/268 |
| 4,169,338 | 10/1979 | Eik | 212/267 X |
| 4,547,119 | 10/1985 | Chance et al. | 414/718 X |
| 4,547,121 | 10/1985 | Nesmith | 212/230 X |

FOREIGN PATENT DOCUMENTS 2530526 1/1984 France ................................ 901/14

Primary Examiner—Joseph J. Rolla
Assistant Examiner—Boris Milef
Attorney, Agent, or Firm—Douglas W. Rudy; Richard B. Megley

[57] ABSTRACT

A double telescoping horizontal arm, adapted for use in a robotic palletizer, including an outer member, an intermediate member and an inner member in telescoping relationship to one another. An idler wheel, mounted to the intermediate member, simultaneously engages both the outer member and the inner member so as to rotate in response to movement of the inner member relative to the intermediate member. Rotation of the idler wheel, in turn, drives the intermediate member in the same direction as the inner member thereby resulting in a double telescoping action. A motorized friction wheel, mounted on the intermediate member, drives the inner member relative to the intermediate member to extend and retract the horizontal arm, and a chain and sprocket arrangement, between the outer, intermediate and inner members, ensures that the speed of the inner member relative to the intermediate member substantially equals the speed of the intermediate member relative to the outer member during extension and retraction of the arm.

4 Claims, 2 Drawing Sheets

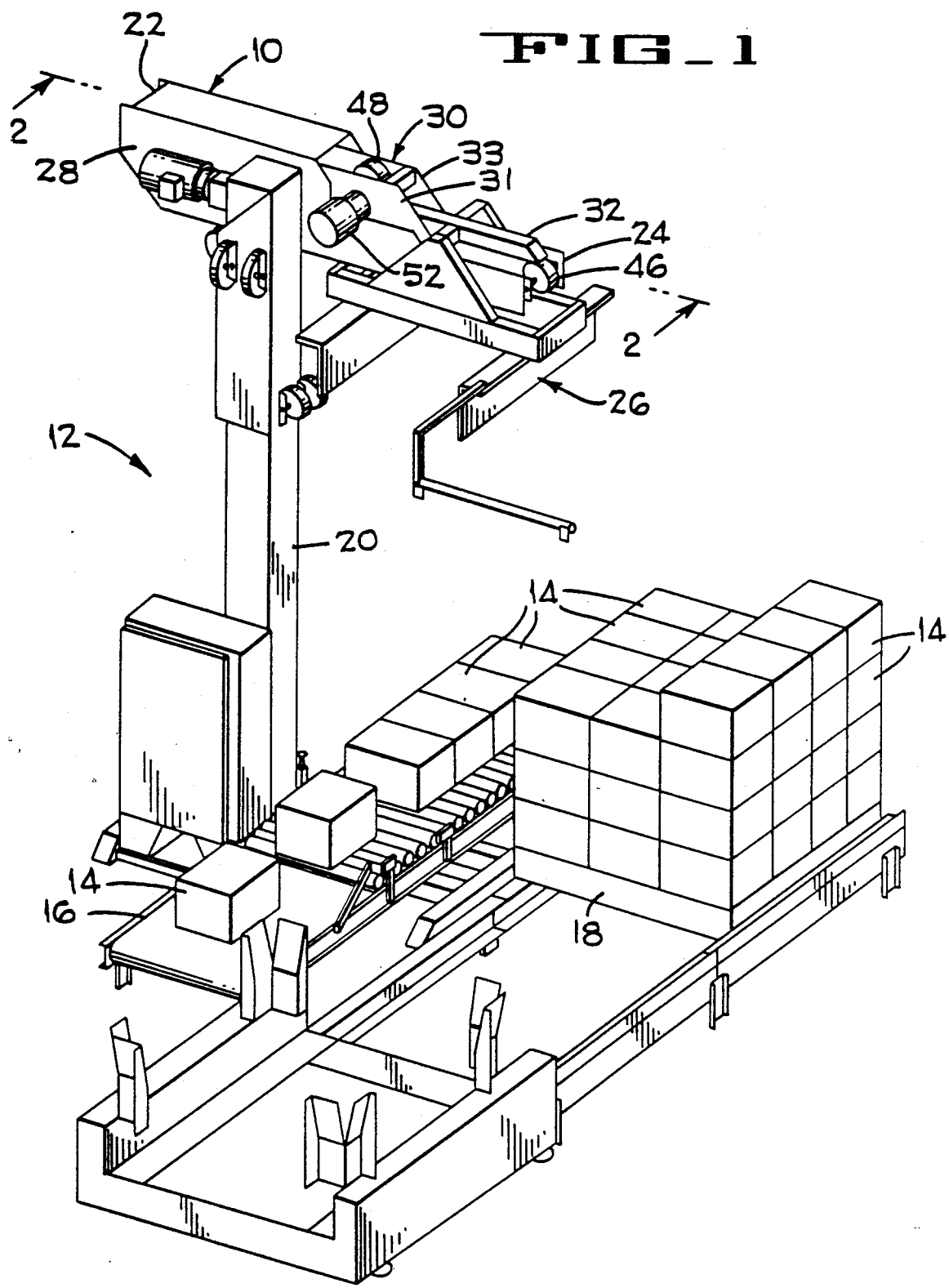

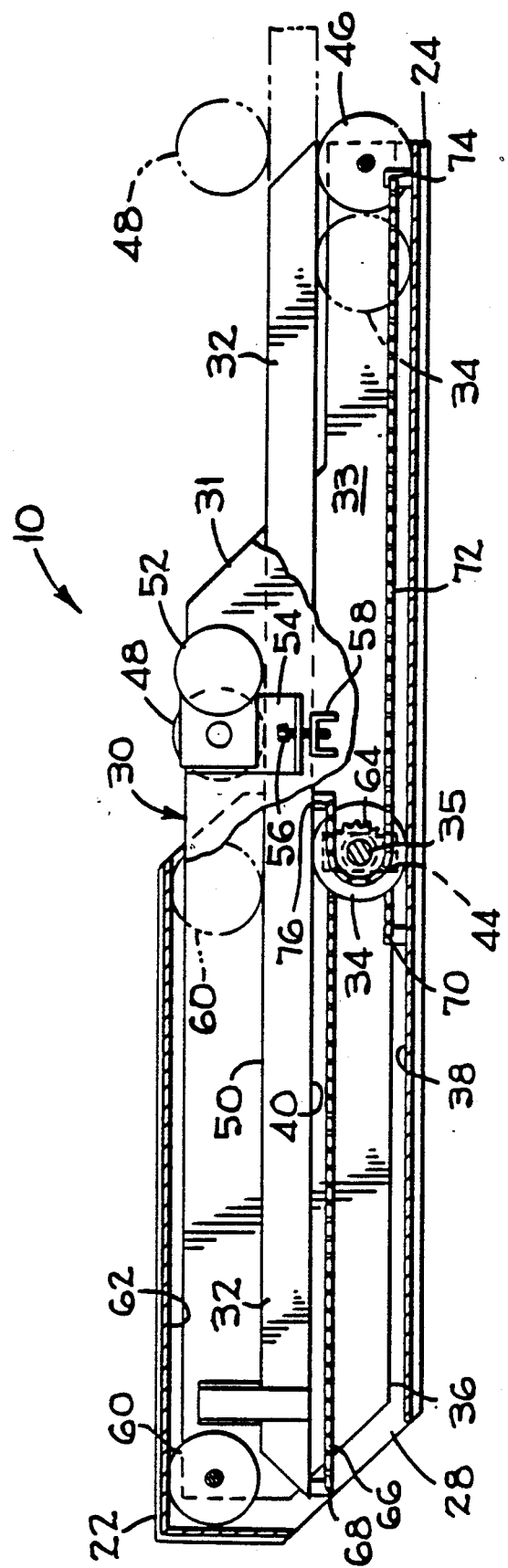
FIG_2

DOUBLE TELESCOPING ARM FOR ROBOTIC PALLETIZERS AND THE LIKE

BACKGROUND OF THE INVENTION

This invention relates to robotic palletizers and, more particularly, to horizontal arms utilized in transporting objects with such palletizers.

In known robotic palletizers, a horizontal arm of fixed length typically extends in opposite directions from both sides of a vertical or "Z" axis, and a hand or grasping assembly moves along the horizontal arm to transport cases or cartons in the horizontal direction. The fixed length of the horizontal arm in such prior palletizers, and, in particular, the projection of the horizontal arm from both sides of the vertical or "Z" axis, increases the overall size of the machine and requires that adequate clearance be maintained along both sides of the "Z" axis. This requirement limits, for example, how closely the palletizer can be placed next to a wall and can render the palletizer unsuitable for use in smaller operations where limited space may be a problem.

In view of the foregoing, it is a general object of present invention to provide a new and improved horizontal arm for robotic palletizers.

It is a more specific object of the present invention to provide a horizontal arm, for use in robotic palletizers, wherein the arm does not need to extend from both sides of the "Z" axis.

It is a still further object of the present invention to provide a horizontal arm for robotic palletizers, wherein the horizontal arm is compact and capable of economical manufacture.

SUMMARY OF THE INVENTION

The invention provides a telescoping horizontal arm adapted for use in a robotic palletizer. The telescoping horizontal arm comprises a rigid, hollow, elongate outer member having an associated longitudinal axis. An elongate intermediate member, having a longitudinal axis aligned substantially parallel with the longitudinal axis of the outer member, is telescopically received in the outer member and includes an elongate lower surface. An idler wheel is mounted within the intermediate member for rotation in a substantially vertical plane and extends partly below the lower surface of the intermediate member. An elongate inner member, telescopically disposed within the intermediate member and having a longitudinal axis aligned substantially parallel with the longitudinal axis of the intermediate member, engages the idler wheel. Means are provided for displacing the inner member relative to the intermediate member in a direction substantially parallel to the longitudinal axis of each so as to rotate the idler wheel and thereby cause the idler wheel to displace the intermediate member, and the inner member, relative to the outer member.

BRIEF DESCRIPTION OF THE DRAWINGS

The features of the present invention are set forth with particularly in the appended claims. The invention, together with the objects and advantages thereof, can best be understood by reference to the following description taken in conjunction with the accompanying drawings wherein like reference numerals identify like elements and wherein:

FIG. 1 is an isometric view of a robotic palletizer having a double telescoping horizontal arm embodying various features of the invention; and FIG. 2 is an a cross-sectional view of the double telescoping horizontal arm shown in FIG. 1 taken along line 2—2 thereof.

DESCRIPTION OF THE PREFERRED EMBODIMENT

Referring to the drawings, a double telescoping horizontal arm 10 embodying the invention is illustrated in the context of a robotic palletizer 12 operable to automatically load packages, cases or cartons 14 from an infeed conveyor 16 onto a pallet 18. The details of the robotic palletizer 12 are shown in the co-pending application of Becicka, et al., entitled "Robotic Palletizer", filed concurrently herewith and incorporated by reference herein.

As illustrated, the double telescoping horizontal arm 10 comprises an elongate assembly mounted for bi-directional vertical movement along a vertical column or "Z"-axis 20 in the robotic palletizer 12. One end 22 of the horizontal arm 10 remains horizontally fixed relative to the vertical column 20, while the opposite end 24 can be horizontally extended or retracted relative to the column 20. A hand assembly 26, adapted to releasably grasp one or more of the cartons 14, is mounted to the extendable end 24 of the horizontal arm.

The telescoping horizontal arm 10 includes an elongate outer member or box frame 28, which, in the illustrated embodiment, is of substantially rectangular cross section and has associated therewith a longitudinal axis. One end of the box frame 28 is partially closed while the other end is open. An elongate intermediate member, or carriage 30, which in the illustrated embodiment is also of substantially rectangular cross section, is telescopically received in the box frame 28 so as to be aligned substantially parallel with the longitudinal axis of the box frame 28.

The telescoping horizontal arm 10 further includes an elongate inner member or hand tube 32, which, in the illustrated embodiment, is of generally rectangular cross section. The hand tube 32 is telescopically disposed within the intermediate member or carriage 30. The longitudinal axis of the hand tube 32 is aligned substantially parallel with the longitudinal axes of the carriage 30 and the box frame 28.

An idler wheel or roller 34 (FIG. 2) is mounted within the carriage 30 for rotation in a substantially vertical plane around an axle 35 oriented substantially perpendicularly to the planes formed by side walls 31 and 33 of the carriage 30. The idler wheel 34 is positioned so that a portion of the wheel extends partly below the lower surface 36 of the carriage 30 and into contact with the bottom interior surface 38 of the box frame 28. The idler wheel 34 also extends into contact with an undersurface 40 of the hand tube 32 at a point substantially diametrically opposed to the point of contact between the idler wheel 34 and the box frame 28. The axle 35 rides in a pair of opposed vertical slots 44 formed in the side walls 31 and 33 of the carriage 30 so as to permit limited vertical movement of the idler wheel 34 relative to the carriage 30.

The undersurface 40 of the inner member or hand tube 32 also rests on a support roller 46 mounted to the forward end of the carriage 30. In this manner, the inner member 32 is supported by the idler wheel 34 and the support roller 46 for axial extension or retraction relative to the carriage 30.

Means are provided for displacing the inner member 32 relative to the intermediate member in a direction substantially parallel to the longitudinal axis of the inner member 32. In the illustrated embodiment, the inner member 32 is extended or retracted relative to the carriage 30 by means of a motor-driven friction or drive wheel 48 mounted to the upper end of the carriage 30 and positioned so as to engage and bear against the upper surface 50 of the inner member 32. The drive wheel 48, together with its associated drive motor 52, is mounted between a pair of brackets 54 which extend along opposite sides of the carriage 30 and which are vertically movable relative thereto. Each of the brackets 54, in turn, is affixed to the carriage 30 by means of a bolt 56 extending through the bracket 54 and into a nut-like tab 58 extending outwardly from each side of the carriage 30. By tightning or loosening the bolts 56 which comprise tensioning means, the vertical position of the motorized drive wheel 48 can be changed relative to the carriage 30. This adjustment allows the user to make the carriage 30 and the hand tube 32 substantially parallel with the box frame 28.

The intermediate member of the carriage 30 is supported for lateral translation relative to the outer member or box frame 28. Part of this support is by means of a roller assembly 60 mounted at the rear of the carriage 30 and engaging the upper interior wall 62 of the box frame 28. The remainder of the carriage 30 is ultimately supported by the idler wheel 34. The supporting force to the front of the carriage 30 is applied upward to the idler wheel 34 at the point where it contacts the lower interior wall of the box frame 28. The vertical position of the idler wheel 34 relative to the carriage 30 is not fixed. Rather, the idler wheel 34 is permitted to float, and the upward contact force from the lower wall of box frame 28 is transmitted directly through the idler wheel 34 to the underside of the inner member 32. This force is then transmitted through the inner member 32 to the carriage 30 via the drive wheel 48, the bolts 56 and the nut-like tabs 58. Accordingly, the traction between the drive wheel 48 and the inner member 32 can be reliably maintained even as the drive wheel 48 and the idler wheel 34 wear during operation.

In the operation, rotation of the friction or drive wheel 48 results in lateral translation of the inner member or hand tube 32 relative to the carriage 30. Movement of the inner member 32 in one direction relative to the carriage 30 causes the idler wheel 34 to rotate. Such rotation of the idler wheel 34 causes the carriage 30 to move in the same direction relative to the outer member or box frame 28. During extension or retraction of the horizontal arm 10, the motorized drive wheel 48 is fixed relative to the carriage 30. Therefore, the inner member 32 moves relative to the carriage 30 while the carriage 30 moves in the same direction relative to the box frame 28. In the illustrated embodiment, the inner member 32 moves at about twice the speed of the carriage 30 due to the locations of contact with the idler wheel 34 —one contacting the other at the idler wheel 34 at the axle and the other at the outer diameter thereof.

Means are provided for ensuring that the speed of the inner member 32 relative to the carriage 30 is substantially equal to the speed of the carriage 30 relative to the box frame 28. To this end, a pair of sprockets 64 are mounted on opposite sides of the idler wheel 34 so as to be co-rotatable therewith. A first chain 66, having one end 68 attached to the rear of the inner member 32, is reeved over one of the sprockets 64. At its opposite end 70, the first chain 66 is attached to the interior of the box frame 28 at a point located rearwardly of the idler wheel 34. A second chain 72, having one end 76 connected to the forward end of the inner member 32, is reeved over the remaining sprocket 64. The second chain 72 is then attached, at its opposite end 74, to the interior of the box frame 28 at a point located forwardly of the idler wheel 34. During extension or retraction of the horizontal arm 10, the chains 66 and 72 function to ensure that the lateral translation of the inner member 32 relative to the box frame 28 is substantially twice the translation of the carriage 30 relative to the box frame 28.

Although a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A telescoping horizontal arm adapted for use in a robotic palletizer, comprising:
    an elongate outer member having an associated longitudinal axis;
    an elongate intermediate member having a longitudinal axis aligned substantially parallel with said outer member longitudinal axis and telescopically received in said outer member, said intermediate member including an elongate lower surface;
    an idler wheel mounted within said intermediate member for rotating in a substantially vertical plane, said idler wheel extending partly below said lower surface into contact with said outer member;
    an elongate inner member telescopically disposed within said intermediate member and having a longitudinal axis aligned, substantially parallel with said intermediate member longitudinal axis and said inner member engaging said idler wheel; and
    means for displacing said inner member relative to said intermediate member in a direction substantially parallel to said inner member longitudinal axis, said displacing means rotating said idler wheel and said idler wheel displacing said intermediate member and said inner member relative to said outer member, said means for displacing comprises a motorized wheel fixedly mounted on said intermediate member and engaging said inner member so as to extend said inner member relative to said intermediate member in response to rotation of said motorized wheel in one direction and to retract said inner member relative to said intermediate member in response to rotation of said motorized wheel in the opposite direction.

2. The invention in accordance with claim 1 wherein said inner member includes an upper surface engaged by and in contact with said motor driven wheel and further includes a lower surface engaging said idler wheel.

3. The invention in accordance with claim 2 wherein said idler wheel is carried by slot means to permit vertical displacement of the idler wheel and said idler wheel vertically displaceable relative to said intermediate member so that contact forces between said inner member and said idler wheel are transmitted through said idler wheel to said outer member.

4. The invention in accordance with claim 3 wherein said telescoping horizontal arm further includes tensioning means for adjusting the contact force between said motorized wheel and said inner member.

* * * * *